Patented Oct. 27, 1925.

1,559,126

UNITED STATES PATENT OFFICE.

ALBERT OBERSOHN, OF BERLIN-CHARLOTTENBURG, WILHELM WACHTEL, OF BERLIN, DANIEL SAKOM, OF WIESBADEN, AND PAUL ASKENASY, OF KARLSRUHE, GERMANY.

PROCESS FOR THE MANUFACTURE OF COLLOIDAL SUBSTANCES IN THE FORM OF SMALL BALLS OR GRAINS.

No Drawing. Original application filed March 13, 1924, Serial No. 699,127. Divided and this application filed January 7, 1925. Serial No. 1,086.

*To all whom it may concern:*

Be it known that I, ALBERT OBERSOHN, a citizen of Hungary, residing at 53 Pestalozzistrasse, Berlin - Charlottenburg, Germany, and I, WILHELM WACHTEL, a citizen of Austria, residing at 61 Bambergerstrasse, Berlin, Germany, and I, DANIEL SAKOM, a citizen of Lithuania, residing at 13 Adolfsallee, Wiesbaden, Germany, and I, PAUL ASKENASY, a citizen of Germany, residing at 44 Kaiserallee, Karlsruhe, Baden, Germany, have jointly invented new and useful Improvements in Processes for the Manufacture of Colloidal Substances in the Form of Small Balls or Grains, for which we have filed applications in Germany, October 2, 1922; Germany, October 14, 1922; Germany, January 27, 1923, of which the following is a specification.

This application which is a divisional application from Serial Number 699,127 relates to a process for producing colloidal substances in the form of small balls or grains.

When a solution of a colloidal substance, such a glue, gelatine, or the like, is passed through a cooling bath composed of a liquid which does not mix with the colloid, the resulting drops of the colloid form into small balls or grains which are rapidly solidified by the action of the cooling bath. The grains so produced may then be removed and dried. Glue in this form is very convenient both for use and for shipment and it dries more easily that in slab form and is more readily melted. In the following specification, the terms glue or solutions of glue are to be understood to include all colloidal substances having the properties of glue which it is or may be considered desirable to produce in granular form.

It has been proposed to use cooling baths of liquids which did not mix with or dissolve the drops during their solidification; but such substances are usually expensive and sometimes offensive or poisonous in their nature. To avoid these disadvantages, the present invention proposes to pass the drops through a cooling gas, to eliminate this difficulty of separating the liquid from the globules formed; there is no loss of expensive reagents, and the globules are kept pure. By this process a cheap and simple preparation is made feasible.

In operation, the colloid is prepared in the form of a hot concentrated, preferably saturated, solution. This solution is sprayed in the form of a shower of drops into a counter-current of the gas. The solution may also be pumped or sprayed under pressure into a vessel containing compressed gas. By this means, the velocity of the fall of the drop is retarded, and the height of the fall may be reduced, and the size of the apparatus correspondingly diminished.

In case any of the cooling gas adheres to the globules, water, aqueous solutions or emulsions may be used as a cleansing agent, when the gas does not mix or react with the colloid. The globules may be passed by gravity from the cooling gas into the cleansing agent.

A preferred temperature for the cooling and cleansing agents is about 1° centigrade: and the glue solution may come straight from the glue separating plant at about 50° C.

It is evident that the cooling and cleansing may be effected by several superposed stratified layers of gases and liquids.

What we claim is:

1. The process of preparing glue globules which consists in preparing a hot concentrated solution of glue, forming said solution into drops by spraying the same under pressure, and passing said drops into and through a gaseous cooling agent under pressure to retard the rate of passage of said drops through said agent.

2. The process of producing glue globules which consists in preparing a hot concentrated solution of glue, forming said solution into drops by spraying under pressure, passing said drops into and through a gaseous cooling agent under pressure to retard the rate of passage of said drops through said agent, and receiving said drops from said cooling agent in a liquid bath.

In testimony whereof we have signed our names to this specification.

ALBERT OBERSOHN.
WILHELM WACHTEL.
DANIEL SAKOM.
PAUL ASKENASY.